United States Patent
Kim et al.

(10) Patent No.: US 10,297,380 B2
(45) Date of Patent: May 21, 2019

(54) WIRELESS POWER RECEPTION APPARATUS AND WIRELESS POWER TRANSMISSION SYSTEM INCLUDING THE SAME

(71) Applicant: LG Innotek Co., Ltd., Seoul (KR)

(72) Inventors: So Yeon Kim, Seoul (KR); Seok Bae, Seoul (KR); Jai Hoon Yeom, Seoul (KR); Sang Won Lee, Seoul (KR); Ji Yeon Song, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/547,777

(22) PCT Filed: Jun. 27, 2016

(86) PCT No.: PCT/KR2016/006815
§ 371 (c)(1),
(2) Date: Jul. 31, 2017

(87) PCT Pub. No.: WO2016/209051
PCT Pub. Date: Dec. 29, 2016

(65) Prior Publication Data
US 2017/0365393 A1 Dec. 21, 2017

(30) Foreign Application Priority Data

Jun. 25, 2015 (KR) .................... 10-2015-0090740

(51) Int. Cl.
*H01F 27/25* (2006.01)
*H01F 38/14* (2006.01)
(Continued)

(52) U.S. Cl.
CPC .............. *H01F 27/25* (2013.01); *H01F 1/14* (2013.01); *H01F 27/28* (2013.01); *H01F 27/365* (2013.01);
(Continued)

(58) Field of Classification Search
None
See application file for complete search history.

(56) References Cited

U.S. PATENT DOCUMENTS 9,730,369 B2 *  8/2017  Kwak ................. H05K 9/0075
9,735,606 B2 *  8/2017  Koyanagi ............. H02J 7/025
(Continued)

FOREIGN PATENT DOCUMENTS

JP  2008-124197 A  5/2008
JP  2010-041906 A  2/2010
(Continued)

OTHER PUBLICATIONS

Derwent Abstract of WO 2014/081118 A1 (Year: 2014).*
(Continued)

*Primary Examiner* — Kevin M Bernatz
(74) *Attorney, Agent, or Firm* — Saliwanchik, Lloyd & Eisenschenk

(57) ABSTRACT

A wireless power receiving apparatus which wirelessly charges power according to one embodiment of the present invention includes a substrate, a soft magnetic layer which is laminated on the substrate and is formed with a plurality of patterns including at least 3 lines radiated from predetermined points, and a coil which is laminated on the soft magnetic layer and receives electromagnetic energy radiated from a wireless power transmitting apparatus.

20 Claims, 16 Drawing Sheets

(51) Int. Cl.
  *H02J 50/10* (2016.01)
  *H01F 1/14* (2006.01)
  *H01F 27/28* (2006.01)
  *H02J 7/02* (2016.01)
  *H04B 5/00* (2006.01)
  *H01F 27/36* (2006.01)
  *H02J 50/12* (2016.01)
  *H02J 50/70* (2016.01)

(52) U.S. Cl.
  CPC .............. *H01F 38/14* (2013.01); *H02J 7/025* (2013.01); *H02J 50/10* (2016.02); *H02J 50/12* (2016.02); *H02J 50/70* (2016.02); *H04B 5/0037* (2013.01)

(56) References Cited

U.S. PATENT DOCUMENTS

| | | | | |
|---|---|---|---|---|
| 9,813,114 | B2* | 11/2017 | Oh | H04B 5/0025 |
| 2006/0202882 | A1* | 9/2006 | Noda | H05K 9/0083 |
| | | | | 342/1 |
| 2008/0317620 | A1* | 12/2008 | Suzuki | B22F 3/26 |
| | | | | 419/19 |
| 2009/0120681 | A1* | 5/2009 | Matsuzaki | H01F 17/06 |
| | | | | 174/350 |
| 2012/0062435 | A1 | 3/2012 | Kato et al. | |
| 2012/0154086 | A1 | 6/2012 | Willemsen et al. | |
| 2014/0002228 | A1 | 1/2014 | Hatanaka et al. | |
| 2014/0017486 | A1* | 1/2014 | Yoo | B29C 67/0011 |
| | | | | 428/325 |
| 2014/0049212 | A1 | 2/2014 | Sawa et al. | |
| 2014/0239892 | A1 | 8/2014 | Sawa et al. | |
| 2016/0055952 | A1* | 2/2016 | Watanabe | H01F 1/16 |
| | | | | 33/361 |
| 2016/0345473 | A1* | 11/2016 | Lee | H05K 9/0081 |

FOREIGN PATENT DOCUMENTS

| | | | | | |
|---|---|---|---|---|---|
| KR | 10-2012-0140183 | A | * | 12/2012 | ............... H01Q 7/06 |
| KR | 10-2012-0140183 | A | | 12/2012 | |
| KR | 10-2014-0010874 | A | * | 1/2014 | ........... H01L 21/205 |
| KR | 10-2014-0065702 | A | | 5/2014 | |
| KR | 10-2015-0001416 | A | * | 1/2015 | ............... H01Q 1/24 |
| KR | 10-2015-0001416 | A | | 1/2015 | |
| KR | 10-2015-0043087 | A | * | 4/2015 | ............ H01L 29/66 |
| KR | 10-2015-0043087 | A | | 4/2015 | |
| WO | WO-2011121933 | A1 | * | 10/2011 | ............... H01Q 7/06 |
| WO | WO-2014081118 | A1 | * | 5/2014 | ........... H05K 9/0081 |

OTHER PUBLICATIONS

International Search Report in International Application No. PCT/KR2016/006815, filed Jun. 27, 2016.
Office Action dated May 21, 2018 in Korean Application No. 10-2015-0090740.
Supplementary European Search Report dated Jan. 3, 2019 in European Application No. 16814764.3.

* cited by examiner

WIRELESS POWER RECEPTION APPARATUS AND WIRELESS POWER TRANSMISSION SYSTEM INCLUDING THE SAME

CROSS-REFERENCE TO RELATED APPLICATIONS

This application is the U.S. national stage application of International Patent Application No. PCT/KR2016/006815, filed Jun. 27, 2016, which claims priority to Korean Application No. 10-2015-0090740, filed Jun. 25, 2015, the disclosures of each of which are incorporated herein by reference in their entirety.

TECHNICAL FIELD

The present invention relates to wireless charging, and more specifically, to a wireless power receiving apparatus and a wireless power transmission system including the wireless power receiving apparatus.

BACKGROUND ART

Wireless power transmitting/receiving technology is a technology which wirelessly supplies power to electronic devices. In order to increase the efficiency of power transmission and reception, it is necessary to minimize energy loss between the wireless power transmitting apparatus and the wireless power receiving apparatus. To this end, a soft magnetic material may be disposed around a transmitting antenna and a receiving antenna so that electromagnetic energy radiated by the transmitting antenna can be focused in a direction of the receiving antenna. When a soft magnetic layer is a sheet containing a ferrite material, magnetic permeability is good, however, there is a limitation related to a thickness of the soft magnetic layer due to the limitation related to the high-temperature firing and magnetic flux density. In addition, when a soft magnetic layer is a sheet which has a composite form containing a metal powder and a polymer resin, there is a problem in terms of lower magnetic permeability.

In contrast, when a soft magnetic layer is a metal ribbon, it is possible to attain high magnetic permeability and magnetic flux density along with a thin thickness. Accordingly, technology for applying a metal ribbon to a soft magnetic layer is required in this case.

DISCLOSURE

Technical Problem

Embodiments of the present invention provide a wireless power receiving apparatus and a wireless power transfer system including the wireless power receiving apparatus.

Technical Solution

A wireless power receiving apparatus which wirelessly charges power according to one embodiment of the present invention includes a substrate, a soft magnetic layer which is laminated on the substrate and is formed with a plurality of patterns including at least 3 lines radiated from a predetermined point, and a coil which is laminated on the soft magnetic layer and configured to receive electromagnetic energy radiated from a wireless power transmitting apparatus.

The pattern may further include an edge configured to surround at least 3 lines radiated from the predetermined point.

The edge may surround at least 6 lines radiated from the predetermined point.

The patterns may further include an edge which surrounds at least two of at least 3 lines radiated from the predetermined point.

One pattern may be disposed to be surrounded by other 3 to 8 patterns.

The pattern may be formed as cracks.

The soft magnetic layer may be a metal ribbon containing Fe.

A frequency band of 100 kHz to 200 kHz may be used.

An average diameter of the pattern may be 50 μm to 600 μm.

A wireless power transmitting system according to one embodiment of the present invention includes a wireless power transmitting apparatus which includes a soft magnetic core and a transmitting coil formed on the soft magnetic core, and a wireless power receiving apparatus which includes a substrate, a soft magnetic layer which is laminated on the substrate and is formed with a plurality of patterns including at least 3 lines radiated from a predetermined point, a receiving coil which is laminated on the soft magnetic layer and receives electromagnetic energy radiated from the wireless power transmitting apparatus, a circuit unit which is connected to the receiving coil and converts the electromagnetic energy into electric energy, and a storage unit which stores the electric energy.

Advantageous Effects

According to embodiments of the present invention, it may be possible to obtain a metal ribbon with high actual permeability within a frequency range, which is used in wireless charging. Accordingly, it may be possible to obtain a wireless power transfer system not only having a slim shape but also having high efficiency in power transferring.

MODES OF THE INVENTION

Figure 1:
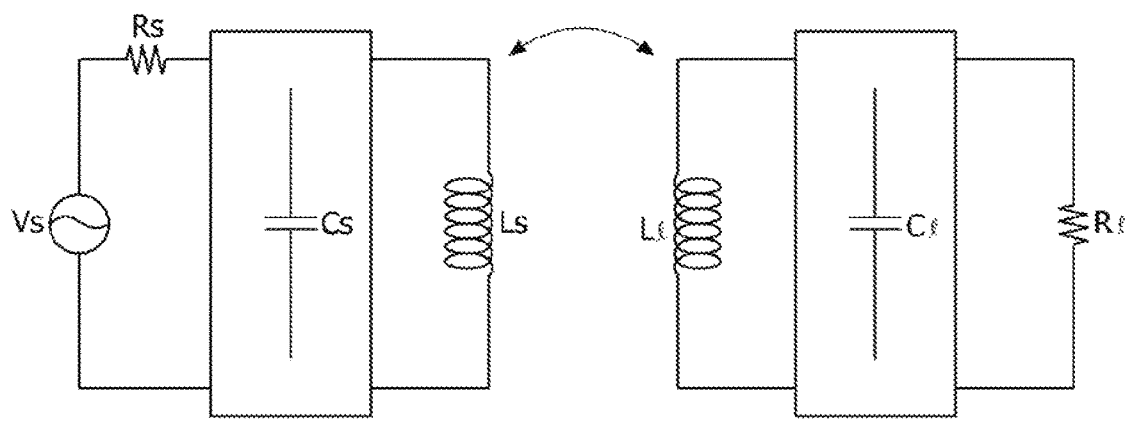
FIG. 1 is a diagram illustrating a magnetic induction method.

While the invention is open to various modifications and alternative embodiments, specific embodiments thereof are shown by way of example in the drawings and will be described in detail. However, it should be understood that there is no intention to limit the invention to the particular embodiments disclosed, but on the contrary, the invention is to cover all modifications, equivalents, and alternatives falling within the spirit and scope of the invention.

It will be understood that, although the terms including ordinal numbers such as "first," "second," etc. may be used herein to describe various elements, these elements are not limited by these terms. These terms are only used to distinguish one element from another. For example, a second element could be termed a first element without departing from the teachings of the present inventive concept, and similarly a first element could be also termed a second element. The term "and/or" includes any and all combination of one or more of the related listed items.

When an element is referred to as being "connected to" or "coupled with" another element, not only it can be directly connected or coupled to the other element, but also it can be understood that intervening elements may be present. In contrast, when an element is referred to as being "directly connected to" or "directly coupled with" another element, there are no intervening elements present.

The terminology used herein is for the purpose of describing particular embodiments only and is not intended to limit the present inventive concept. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be described in detail with reference to the accompanying drawings, and regardless of the numbers in the drawings, the same or corresponding elements will be assigned with the same numbers and overlapping descriptions will be omitted in this specification.

Hereinafter, a wireless power transfer system according to an embodiment of the present invention is explained in detail with reference to the drawings. The embodiments introduced in the following are provided by way of examples so that the spirit of the present invention can be fully appreciated to those skilled in the art. Thus, the present invention is not limited to the embodiments explained in the following, but may be embodied in other forms. In addition, regarding the drawings, the size and the thickness of an apparatus may be expressed exaggeratively for convenience. The same reference numbers refer to the same components throughout the specification.

Embodiments selectively use a variety type of frequency bands ranging from low frequency (50 kHz) to high frequency (15 MHz) for wireless power transfer, and require support of a communication system capable of exchanging data and controlling signals for controlling system.

Embodiments may be applied to various industrial fields such as a mobile terminal industry, a smart watch industry, a computer and laptop industry, a household appliances industry, an electric vehicle industry, a medical device industry and a robot industry, which use or require a battery.

Embodiments may take into consideration a system capable of transferring power to at least one device using one or a plurality of transfer coils provided in the device.

It is possible to treat a battery shortage problem in mobile devices such as smart phones, laptops and the like according to the embodiments, for example, when using a smart phone or a laptop while placing the smart phone or the laptop on a charging pad, the battery will be charged automatically, and it will be possible to use the smart phone or the laptop for a longer period of time. In addition, if a wireless charge pad is installed in public places such as a coffee shop, an airport, a taxi, an office or a restaurant, it is possible to charge various types of mobile devices irrespective of a type of charging terminal which is different depending on the individual mobile device manufacturer. Furthermore, if wireless power transfer technology is applied to household electrical appliances such as vacuum cleaners, fans, etc., there is no need to look for power cables, and complex wires can be eliminated in the home, which can reduce the amount of wiring in buildings and increase efficiency of the utility of space. Moreover, it takes a lot of time to charge an electric car with a current household power source; however, when transferring high power through wireless power transfer technology, it is possible to reduce the charge time. In the case of installing a wireless charging facility on a floor of a parking lot, it is possible to eliminate inconvenience related to preparing a power cable near an electric car.

The terms and abbreviations used in the embodiments are as follows:

Wireless Power Transfer System: a system providing wireless power transferring within a magnetic field area Transmitting unit (Wireless Power Transfer System-Charger): a device providing wireless power transfer to power receivers of multiple devices within a magnetic field area and managing the entire system.

Receiving unit (Wireless Power Transfer System-Device): a device to which wireless power transfer is provided from a power transmitter within a magnetic field area.

Charging Area: an area in which actual wireless power transfer is made within a magnetic field area, wherein the area may vary depending on a size, power required and operating frequency of the products to which power is transferred.

S parameter (Scattering parameter): S parameter is a ratio of an input voltage to an output voltage on the frequency distribution, wherein the S parameter is a ratio of an input port to an output port (Transmission; S21), or a self reflection value of each input/output port, that is an output value (Reflection; S11, S22) which is reflected and returned back by its input value.

Quality factor (Q): a value of Q in resonance means quality of selection of the frequency. The higher the value of Q, the better the resonance characteristics. The value of Q is expressed as a ratio of energy stored in a resonator to energy lost.

Regarding the principle of transferring power wirelessly, one of the principles of wireless power transfer is related to a magnetic induction method.

The magnetic induction method is a non-contact energy transfer technology in which an electromotive force is generated in a load inductor Ll via magnetic flux generated when a source inductor Ls and the load inductor Ll are brought to be close to each other and current is supplied to one of the source inductors Ls.

FIG. 1 illustrates a diagram of a magnetic induction method equivalent circuit.

Referring to FIG. 1, the transmitting unit in a magnetic induction method equivalent circuit may be embodied by a source voltage Vs depending on an apparatus supplying power source, a source resistance Rs, a source capacitor Cs to match impedance and a source coil Ls to magnetically couple with a receiving unit, and the receiving unit may be shown by a load resistance Rl which is an equivalent resistance of the receiving unit, a load capacitor Cl to match impedance and a load coil Ll to magnetically couple with the transmitting unit, wherein a degree of magnetic coupling of the source coil Ls and the load coil Ll may be shown by mutual inductance Msl.

If a ratio S21 of an input voltage to an output voltage is calculated from the magnetic induction equivalent circuit in FIG. 1 composed of only coils without the source capacitor Cs and the load capacitor Cl to match impedance and a condition for maximum power transfer is established, the condition for maximum power transfer satisfies an equation 1 below.

$$Ls/Rs = Ll/Rl \quad \text{Equation 1}$$

According to equation 1, when a ratio of the inductance of the transmitting coil Ls to the source resistance Rs and a ratio of the load coil Ll to the load resistance Rl are the same, maximum power transfer becomes possible. Because there is no capacitors to compensate for reactance in a system in which only inductance is present, the self reflection value S11 of the input/output port at a point at which the maximum power delivery is created cannot be 0, and efficiency of power delivery may vary greatly based on the value of the mutual inductance Msl. Accordingly, the source capacitor Cs may be added to the transmitting unit as a compensation capacitor, and the load capacitor Cl may be added to the receiving unit. The compensation capacitors Cs and Cl may be connected in series or in parallel to, for example, the receiving coil Ls and the load coil Ll respectively. In addition, for impedance matching, passive elements such as additional capacitors and inductors as well as the compensation capacitor may be added to each of the transmitting unit and the receiving unit.

Based on such wireless power transfer principles, a wireless power transfer system for delivering power through a magnetic induction method or a magnetic resonance method will be described.

Figure 2:
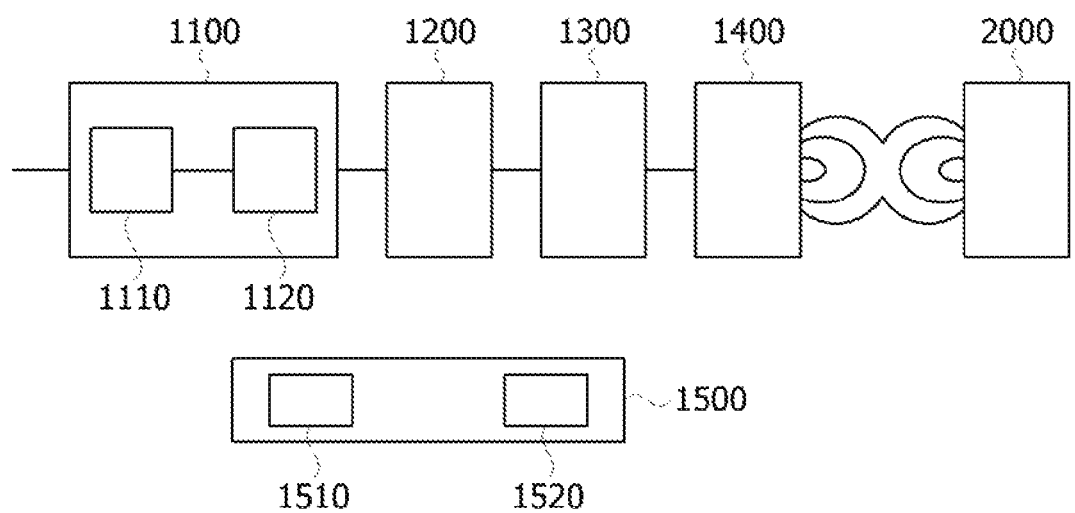
FIG. 2 is a block diagram showing a transmitting unit, which is one of the subsystems that constitutes a wireless power transfer system.

FIG. 2 is a block diagram showing a transmitting unit as one of the subsystems which constitute a wireless power transfer system.

Referring to FIG. 2, the wireless power transfer system may include a transmitting unit 1000 and a receiving unit 2000 to which power is wirelessly transferred from the transmitting unit 1000, wherein the transmitting unit 1000 may include an AC/DC conversion unit 1100 at the transmission side, a DC/AC conversion unit 1200 at the transmission side, an impedance matching unit 1300 at the transmission side, a transmitting coil unit 1400, and a communication and control unit 1500 at the transmission side. In the present disclosure, the transmitting unit 1000 may be alternatively used with a wireless power transmitting apparatus.

The AC/DC conversion unit 1100 at the transmission side is a power conversion unit that converts an AC signal provided from the outside under the control of the communication and control unit 1500 at the transmission side into a DC signal, and the AC/DC conversion unit 1100 at the transmission side may include a rectifier 1110 and a DC/DC conversion unit 1120 at the transmission side as a subsystem. The rectifier 1110 is a system that converts an AC signal that has been provided into a DC signal and, as in the embodied examples, the rectifier 1110 may be a diode rectifier which has relatively high efficiency when operated at a high frequency, a synchronous rectifier which is capable of being a one-chip type or a hybrid rectifier which is able to save cost and space and have a high degree of freedom in Dead time. In addition, the AC/AC conversion unit 1120 at the transmission side regulates a level of an AC signal provided from the rectifier 1110 under the control of the communication and control unit 1500 at the transmission side, and as in the embodied examples, the AC/AC conversion unit 1120 may be a Buck converter which lowers a level of an input signal, a Boost converter which raises a level of an input signal, a Buck Boost converter which is able to lower or raise a level of an input signal, or a Cuk converter. Moreover, the AC/AC conversion unit 1120 at the transmission side may include switch elements which serve as a power conversion control function, inductors and capacitors which serve a power conversion parameter role or serve as an output voltage smoothing function, trances which serve to regulate voltage gains or serve as an electrical separation function (an insulation function), etc., and the AC/AC conversion unit 1120 at the transmission side may serve to eliminate ripple components included in the input AC signal or to pulsate components (alternative components included in a AC signal). Furthermore, a difference between a command value of the output signal of the AC/AC conversion unit 1120 at the transmission side and an actual output value may be regulated via a feedback method, which can be performed through the communication and control unit 1500 at the transmission side.

The DC/AC conversion unit 1200 at the transmission side is a system that converts an DC signal output from the AC/DC conversion unit 1100 at the transmission side under the control of the communication and control unit 1500 at the transmission side into a AC signal, and regulates a frequency of the converted AC signal, and as in the embodied examples, there is a Half bridge inverter or a Full bridge inverter. In addition, the DC/AC conversion unit 1200 at the transmission side may include oscillators which generate a frequency of the output signal and power amplifiers which amplify the output signal.

The impedance matching unit 1300 at the transmission side improves a flow of a signal by minimizing a reflection wave at points having different impedance. Since the two coils of the transmitting unit 1000 and the receiving unit 2000 are spatially separated and thus leakage of the magnetic field is large, it is possible to improve the efficiency of the power delivery by correcting differences of the impedance between two connecting ends of the transmitting unit 1000 and the receiving unit 2000. The impedance matching unit 1300 at the transmission side may be composed of an inductor, a capacitor and a resistance element, and may regulate an impedance value to match the impedance by varying inductance of the inductor, capacitance of the capacitor and a value of resistance of the resistance element under the control of the communication and control unit 1500. In the case the magnetic induction type wireless power transfer system transfers power, the impedance matching unit 1300 at the transmission side may have a serial resonance structure or a parallel resonance structure, and it is possible to minimize energy loss by increasing an inductance coupling coefficient between the transmitting unit 1000 and the receiving unit 2000.

The coil 1400 at the transmitting side may be embodied by a number of coils or a single coil. In a case that the coil 1400 at the transmission side is provided with a plurality of coils, the coils may be arranged to be apart from each other, or arranged to be overlapped with each other. When the coils are arranged to be overlapped, the overlapped area can be determined by taking into consideration of a deviation of a magnetic flux density. In addition, when manufacturing the coil 1400 at the transmission side, the coil 1400 may be manufactured by taking into consideration of internal resistance and radiation resistance. At that time, when the resistance component is small, the Quality factor can be increased and the transfer efficiency can be improved.

The communication and control unit 1500 is a subsystem and may include a control unit 1510 at the transmission side and a communication unit 1520 at the transmission side. The control unit 1510 at the transmission side may serve to regulate the output voltage of the AC/DC conversion unit 1100 at the transmission side by taking into consideration of a required amount of power, a current amount of charge and the wireless power method of the receiving unit 2000. In addition, it is possible to generate a frequency and a switching waveform to drive the DC/AC conversion unit 1200 at the transmission side by taking into consideration the maximum power transfer efficiency, and to control power to be transferred. Moreover, it is possible to control overall operation of the receiving unit 2000 by using an algorithm, a program, or an application required to control what is read from a storage unit (not shown) of the receiving unit 2000. On one hand, the control unit 1510 at the transmission side may be referred to as a microprocessor, a Micro Controller Unit or a Micom. The communication unit 1520 at the transmission side may communicate with a communication unit 2620 at a reception side, and a bluetooth method may be used as one example of a communication method. The communication unit 1520 at the transmission side and the communication unit 2620 at the reception side can transmit and receive charge status information and charge control commands and the like between each other. As charge status information, the number of the receiving units 2000, a remaining battery level, the number of charging, an amount of usage, a capacity of a battery, a ratio of a battery and a transfer amount of power of the transmitting unit 1000 may be included. Furthermore, the communication unit 1520 at the transmission side may transmit a charge function control signal which controls a charge function of the receiving unit 2000, and the charge function control signal may be a control signal that controls the receiving unit 2000 so as to enable or disable the charge function.

On one hand, the transmitting unit 1000 may composed of hardware which is different from that of the communication unit 1520 at the transmission side, therefore the transmitting unit 1000 may communicate with an out-band method. On the other hand, the transmitting unit 1000 and the communication unit 1520 at the transmission side may be embodied as one hardware unit, and therefore, the transmitting unit 1000 may communicate with an in-band method. Furthermore, the communication unit 1520 at the transmission side and the control unit 1510 at the transmitting side may be composed separately, and also in the receiving unit 2000, the communication unit 2620 at the reception side may be included in a control unit of the receiving apparatus or composed separately from the control unit thereof.

Figure 3:
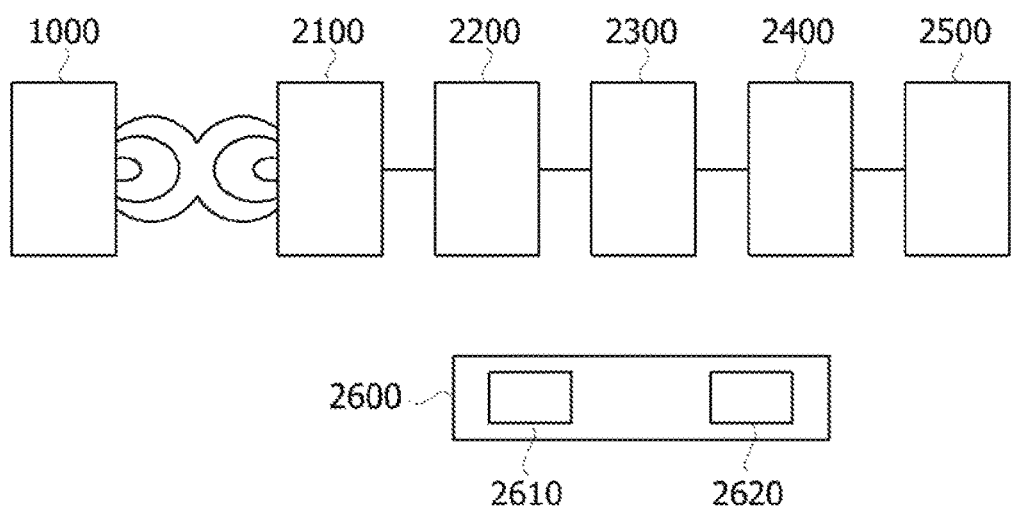
FIG. 3 is a block diagram showing a receiving unit, which is one of the subsystems that constitutes a wireless power transfer system.

FIG. 3 is a block diagram showing a receiving unit as one of the subsystems which constitutes a wireless power transfer system.

Referring to FIG. 3, the wireless power transfer system may include the transmitting unit 1000 and the receiving unit 2000 to which power is wirelessly transferred from the transmitting unit 1000, wherein the receiving unit 2000 may include a coil unit 2100 at the reception side, a matching unit 2200 at the reception side, an AC/DC conversion unit 2300 at the reception side, a DC/DC conversion unit 2400 at the reception unit, a load unit 2500 at the reception side and a communication and control unit 2600 at the reception side. In the present disclosure, the receiving unit 2000 may be alternatively used with a wireless power receiving apparatus.

The coil unit 2100 at the reception side may receive power through a magnetic induction method, and a single induction coil or a plurality of induction coils may be provided. In addition, the coil unit 2100 at the reception side may be provided with an antenna for near field communication. The coil unit 2100 at the reception side may be the same as the coil unit 1400 at the transmission side. The size of the receiving antenna may depend on electrical characteristics of the receiving unit 2000.

The matching unit 2200 at the reception side performs impedance matching between the transmitting unit 1000 and the receiving unit 2000.

The AC/DC conversion unit 2300 at the reception side generates a DC signal by rectifying the AC signal, which is output from the coil unit 2100 at the reception side.

The DC/DC conversion unit 2400 at the reception side can regulate a level of the DC signal, which is output from the AC/DC conversion unit 2300 at the reception unit, to be adapted to a capacity of the load unit 2500.

The load unit 2500 may include a battery, a display, a sound output circuit, a main processor, and various sensors.

The communication and control unit 2600 at the reception unit may be activated by wake-up power from the communication and control unit 1500 at the transmission side, perform communication with the communication and control unit 1500 at the transmission side, and control an operation of the subsystem of the receiving unit 2000.

The receiving unit 2000 may be embodied in a single receiving unit or a plurality of receiving units, and energy can be wirelessly delivered from the transmitting unit 1000 simultaneously. In other words, in terms of a magnetic induction method, a plurality of target receiving units 2000 may be supplied with power from one transmitting unit 1000 as a result of having a plurality of coil units at the reception side, which are independent of each other. In this case, the matching unit 1300 at the transmission side of the transmitting unit 1000 may adaptively perform impedance matching among the plurality of the receiving units 2000.

Moreover, in the case that the embodied receiving unit 2000 is a plurality of receiving units, the system of the receiving units 2000 may be of the same type or a different type.

Meanwhile, looking at a relationship between frequency and size of a signal of the wireless power transfer system, in the case of wireless power transfer in a magnetic induction method, in the transmitting unit 1000, an AC signal of 60 Hz having 110 V to 220 V may be applied to the AC/DC conversion unit 1100 at the transmission side, and the AC/DC conversion unit 1100 may convert the AC signal into a DC signal having 10 V to 20 V and output the signal, and the DC signal may be applied to the DC/AC conversion unit 1200 at the transmission side, and the DC/AC conversion unit 1200 may output a AC signal of 125 KHZ. In addition, the AC signal of 125 KHz may be input to the AC/DC conversion unit 2300 at the reception side of the receiving unit 2000, and the AC/DC conversion unit 2300 may convert the AC signal into a DC signal having 10 V to 20 V, and the DC/DC conversion unit 2400 at the reception side may output a DC signal which is appropriate for the load unit 2500, for example, a DC signal having 5 V, and deliver it to the load unit 2500.

Figure 4:
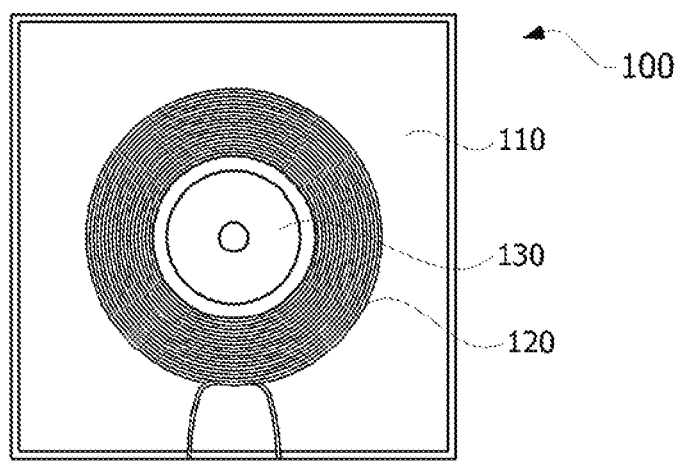
FIG. 4 is a drawing showing a part of a wireless power transmitting apparatus according to one embodiment of the present invention.
Figure 5:
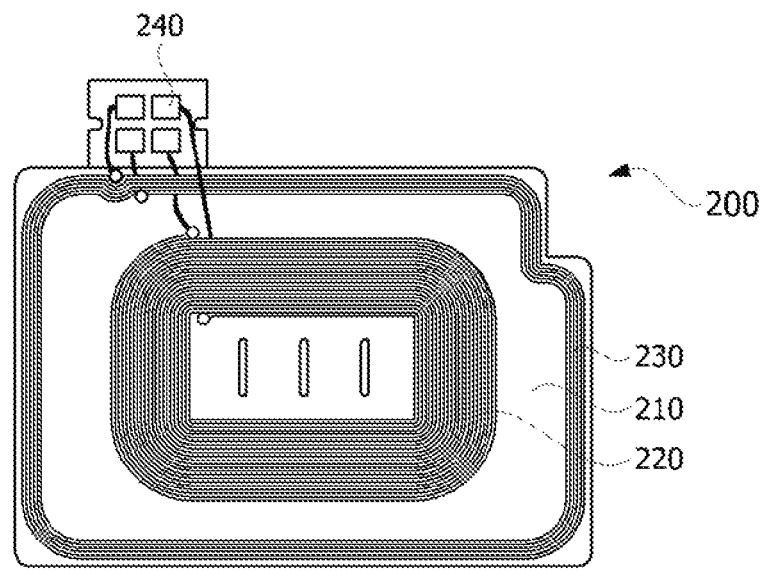
FIG. 5 is a drawing showing a part of a wireless power receiving apparatus according to one embodiment of the present invention.

FIG. 4 is a drawing showing a part of a wireless power transmitting apparatus according to one embodiment of the present invention, and FIG. 5 is a drawing showing a part of a wireless power receiving apparatus according to one embodiment of the present invention. Here, the wireless power transmitting apparatus may be a part of a component of the transmitting unit 1000, and the wireless power transmitting apparatus may be a part of a component of the receiving unit 2000.

Referring to FIG. 4, a wireless power transmitting apparatus 100 includes a transmitting circuit (not shown), a soft magnetic core 110, a transmitting coil 120 and a permanent magnet 130.

The soft magnetic core 110 may be made of a soft magnetic material having a thickness of several mm. In addition, the permanent magnet 130 may be surrounded by the transmitting coil 120. Here, the permanent magnet 130 is not an essential component, and may be omitted according to specifications.

Referring to FIG. 5, the wireless power receiving apparatus 200 includes a receiving circuit (not shown), a soft magnetic layer 210, and a receiving coil 220. The soft magnetic layer 210 may be laminated on a substrate (not shown). The substrate may be made of multiple layers of fixed sheets, may be bonded to the soft magnetic layer 210, and then make the soft magnetic layer 210 to be fixed.

The soft magnetic layer 210 focuses electromagnetic energy which is radiated from the transmitting coil 120 of the wireless power transmitting apparatus 100.

The receiving coil 220 is laminated on the soft magnetic layer 210. The receiving coil 220 may be wound in a parallel direction with the soft magnetic layer 210 on the soft magnetic layer 210. For example, in a receiving antenna applied to smartphones, the receiving coil may be in a form of a spiral coil having an outer diameter of 50 mm or less and an inner diameter of 20 mm or more. The receiving circuit converts the received electromagnetic energy into electric energy via the receiving coil 220 and charges a battery (not shown) with the converted electric energy.

Although not shown, a heat-radiating layer may be further included between the soft magnetic layer 210 and the receiving coil 220. In the present disclosure, a substrate, the soft magnetic layer 210 and the receiving coil 220 may be referred to as a receiving antenna.

On one hand, when the wireless power receiving apparatus 200 has a WPC (Wireless Power Consortium) function and NFC (Near Field Communication) function at the same time, a NFC coil 230 may be further laminated on the soft magnetic layer 210. The NFC coil 230 may be configured to surround an outer circumference of the receiving coil 220.

In addition, both of the receiving coil 220 and the NFC coil 230 may be electrically connected via terminals 240.

When the soft magnetic layer 210 is a sheet containing a ferrite, there is good magnetic permeability, however, there is a limitation related to a thickness of the soft magnetic layer due to the limitation with respect o high-temperature firing and magnetic flux density. In addition, when the soft magnetic layer 210 is a sheet which has a composite form containing a metal powder and a polymer resin, there is a problem in terms of a lower magnetic permeability due to the polymer resin. In contrast, when the soft magnetic layer 210 is a metal ribbon, it is possible to attain high magnetic permeability and magnetic flux density with a thin thickness. However, the metal ribbon has a severe problem in terms of magnetic loss in a frequency area used for wireless charging.

According to an embodiment of the present invention, while a metal ribbon is used as the soft magnetic layer 210, it is intended to reduce eddy current loss caused by cracks being formed on the metal ribbon.

Figure 6:
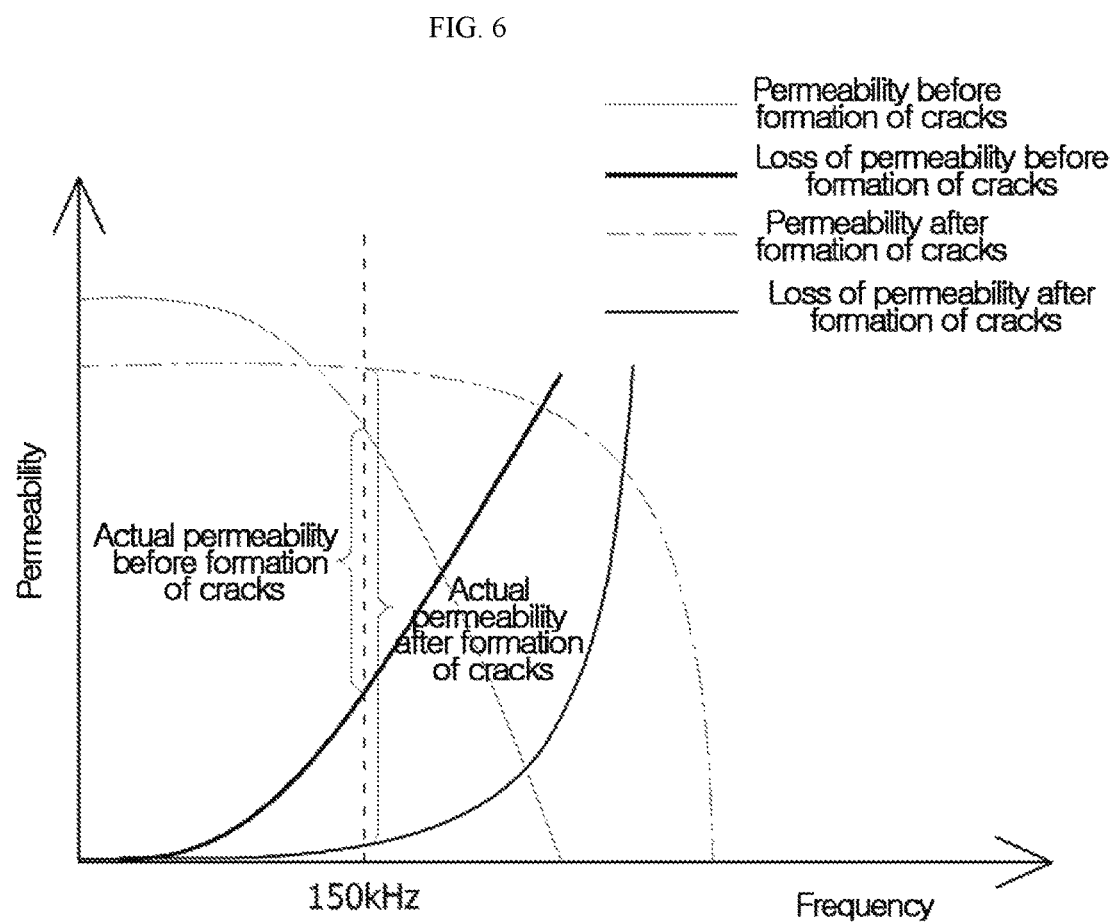
FIG. 6 is a graph comparing actual permeability per frequency before and after a crack is formed on a metal ribbon.

FIG. 6 is a graph comparing actual permeability per frequency before and after a crack is formed on a metal ribbon. Here, a difference between magnetic permeability and a loss of magnetic permeability may mean the actual permeability.

Referring to FIG. 6, it may be seen that, in the frequency area in which wireless charging is used, for example, in a band of about 150 kHz, the actual permeability after cracks are formed in the metal ribbon is significantly higher than the actual permeability before the cracks are formed.

In the present disclosure, a metal ribbon means a non-crystalline or a nanocrystalline metal or an alloy made of very thin foil via techniques such as Atomizer. A thickness of the metal ribbon may be, for example, 0.01 mm to 0.04 mm. In the present disclosure, the metal ribbon may be a metal ribbon containing Fe.

When using the metal ribbon as the soft magnetic layer 210 of the wireless power receiving apparatus 200, it is possible to reduce an eddy current loss and improve the efficiency of transfer by forming cracks on the metal ribbon. However, when irregular cracks are formed on the metal ribbon, the effect of improving the transfer efficiency can be decreased, and the performance of the soft magnetic layer becomes ununiform so that a problem arises in that reliable results cannot be obtained.

According to an embodiment of the present invention, forming a uniform pattern of cracks on the metal ribbon is intended to improve the transfer efficiency of the soft magnetic layer, and to make the performance of the soft magnetic layer uniform.

Figure 7:
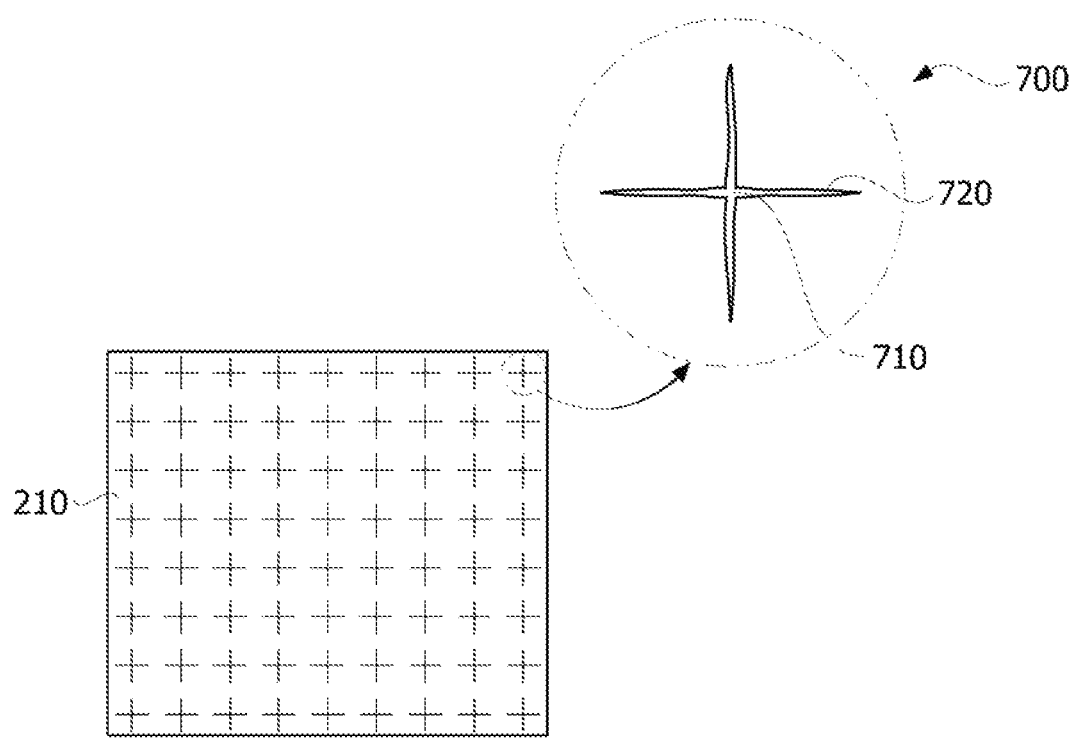
FIG. 7 to FIG. 9 show top views of a soft magnetic substrate according to one embodiment of the present invention.
Figure 8:
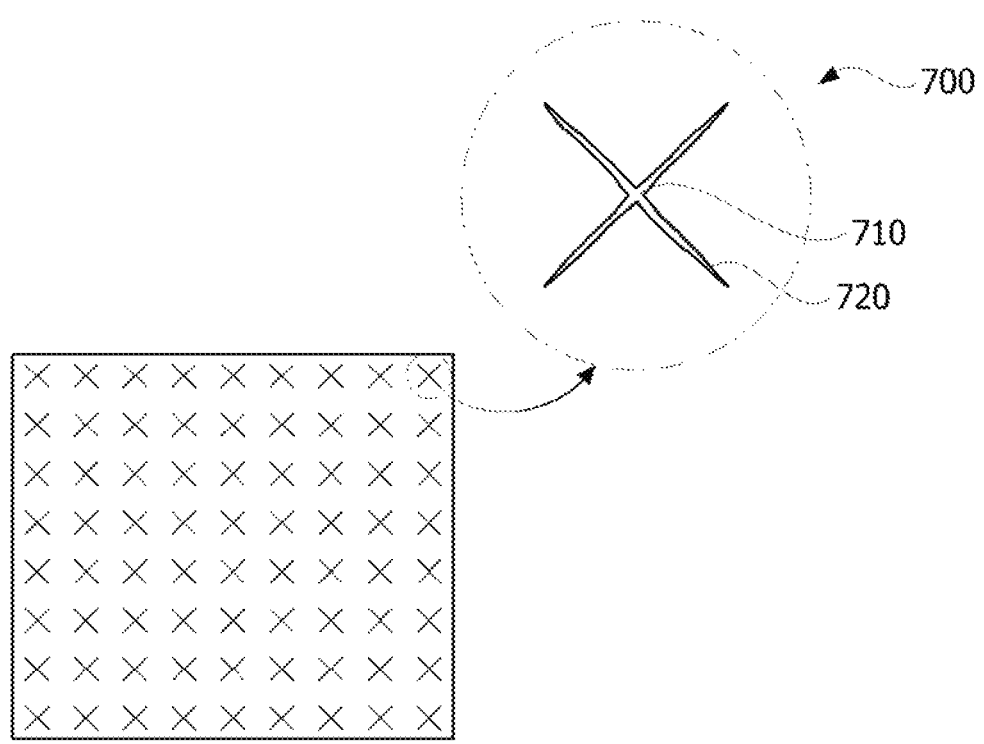
Figure 9:
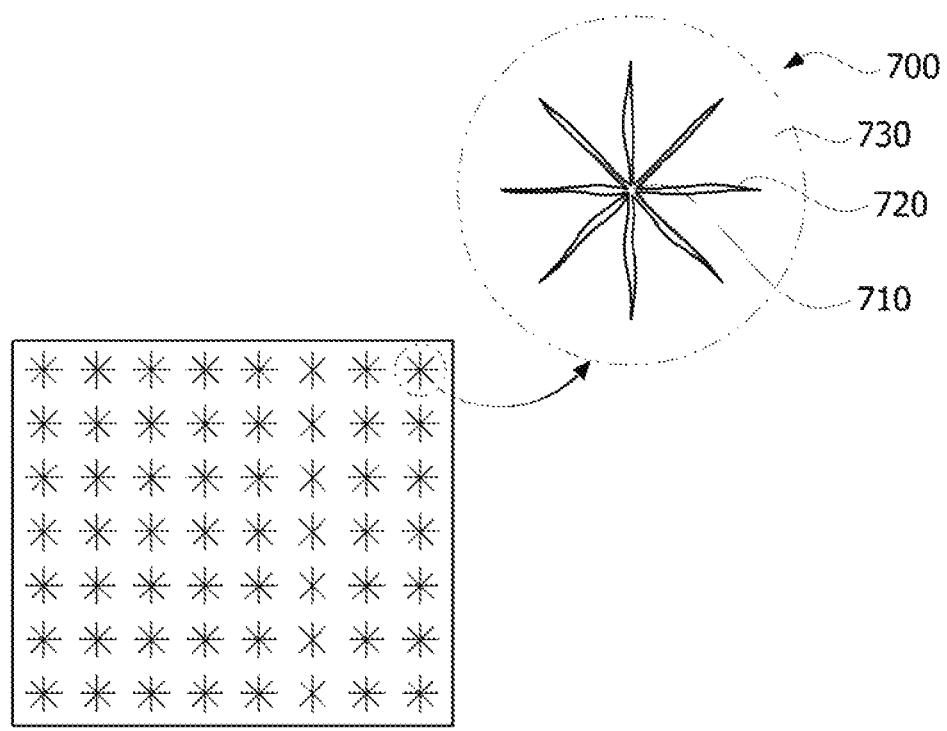

FIG. 7 to FIG. 9 show top views of a soft magnetic substrate according to one embodiment of the present invention.

Referring to FIG. 7 to FIG. 9, a pattern including at least 3 lines 720 which are radiated from a predetermined point 710 is formed on the soft magnetic layer 210. Here, the pattern may be formed as cracks. In this case, a plurality of patterns 700 may be formed repeatedly, and one pattern 700 may be arranged to be surrounded by a plurality of patterns, for example, by 3 to 8 patterns 700. In addition, a non-pattern area may be formed between the patterns.

As described above, when a repetitive pattern is formed on the soft magnetic layer 210, it is possible to reduce an eddy current loss and to obtain uniform and predictable transfer efficiency.

At this time, an average diameter of each pattern 700 may be 50 μm to 600 μm, preferably 75 μm to 500 μm, and more preferably 100 μm to 300 μm. When the diameter of the pattern 700 is less than 50 μm, there may be a problem in terms of creating excess metal particles on a surface of the metal ribbon when forming cracks. In the case metal particles are present on the surface of the soft magnetic layer 210, there is a risk of circuit shorting because the metal particles may penetrate into the circuit. In contrast, when the diameter of the pattern 700 exceeds 600 μm, the effect of crack formation, that is, the effect of increasing the actual permeability may be decreased because the distance between the patterns 700 is great.

Figure 10:
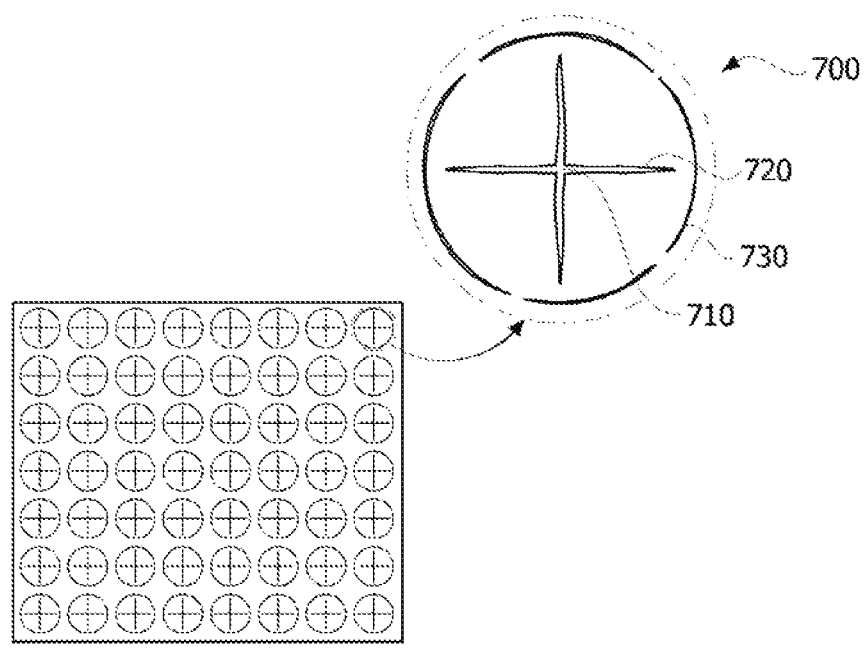
FIG. 10 and FIG. 11 show top views of a soft magnetic substrate according to another embodiment of the present invention.
Figure 11:
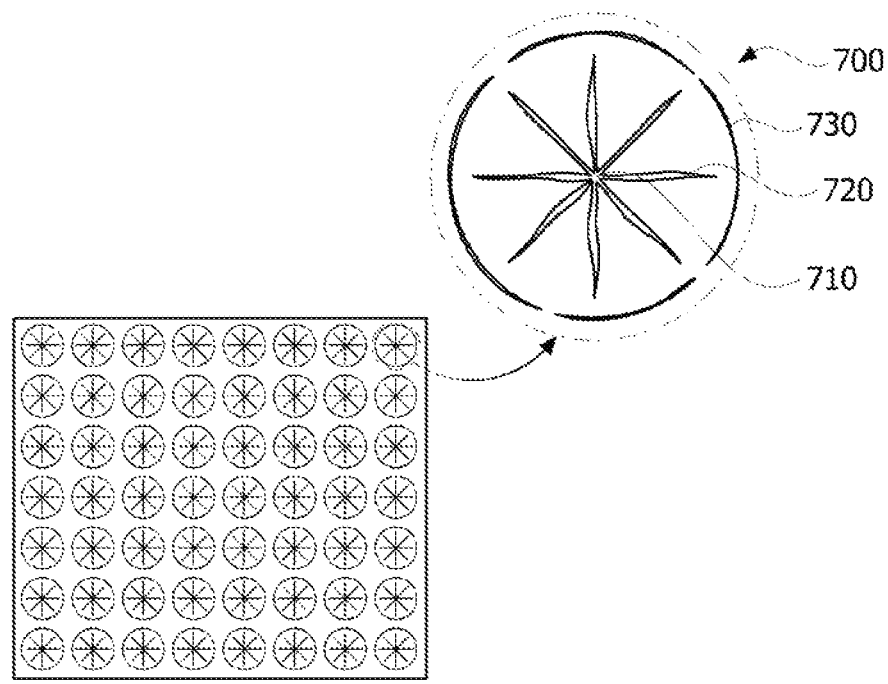

FIG. 10 and FIG. 11 show top views of a soft magnetic substrate according to another embodiment of the present invention.

Referring to FIG. 10 and FIG. 11, a pattern 700 including at least 3 lines 720 which are radiated from predetermined points 710, and an edge 730 which is surrounding the lines 720 is formed on the soft magnetic layer 210. Here, the pattern may be formed as cracks. Here, the edge 730 is not a crack which is completely cut off, but a part of the crack continues and another part of the crack discontinues. In this case, a plurality of patterns 700 may be formed repeatedly, and one pattern 700 may be arranged to be surrounded by a plurality of patterns, for example, by 3 to 8 patterns 700.

As described above, when a repetitive pattern is formed on the soft magnetic layer 210, it is possible to reduce an eddy current loss and to obtain uniform and predictable transfer efficiency.

At this time, an average diameter of each pattern 700 may be 50 μm to 600 μm, preferably 75 μm to 500 μm, and more preferably 100 μm to 300 μm. When the diameter of pattern 700 is less than 50 μm, there may be a problem in terms of metal particles being created on a surface of the metal ribbon when forming cracks. In the case metal particles are present excessively on the surface of the soft magnetic layer 210, there is a risk of circuit shorting because the metal particles may penetrate into the circuit. In contrast, when the diameter of the pattern 700 exceeds 600 μm, the effect of crack formation, that is, the effect of increasing the actual permeability may be decreased because the distance between the patterns 700 is great. When the pattern 700 includes the edge 730, the effect of crack formation is further increased, boundaries between the patterns 700 are clearly distinguished, and an aspect of the repetitive pattern becomes clear, so that the uniformity of the quality can be further increased.

Preferably, as shown in FIG. 11, the pattern 700 may include at least 6 lines 720 which are radiated from predetermined points 710, and an edge which surrounds the lines 720. If at least 6 lines 720 which are radiated are formed within the edge 730, the effect of crack formation may be maximized.

Figure 12:
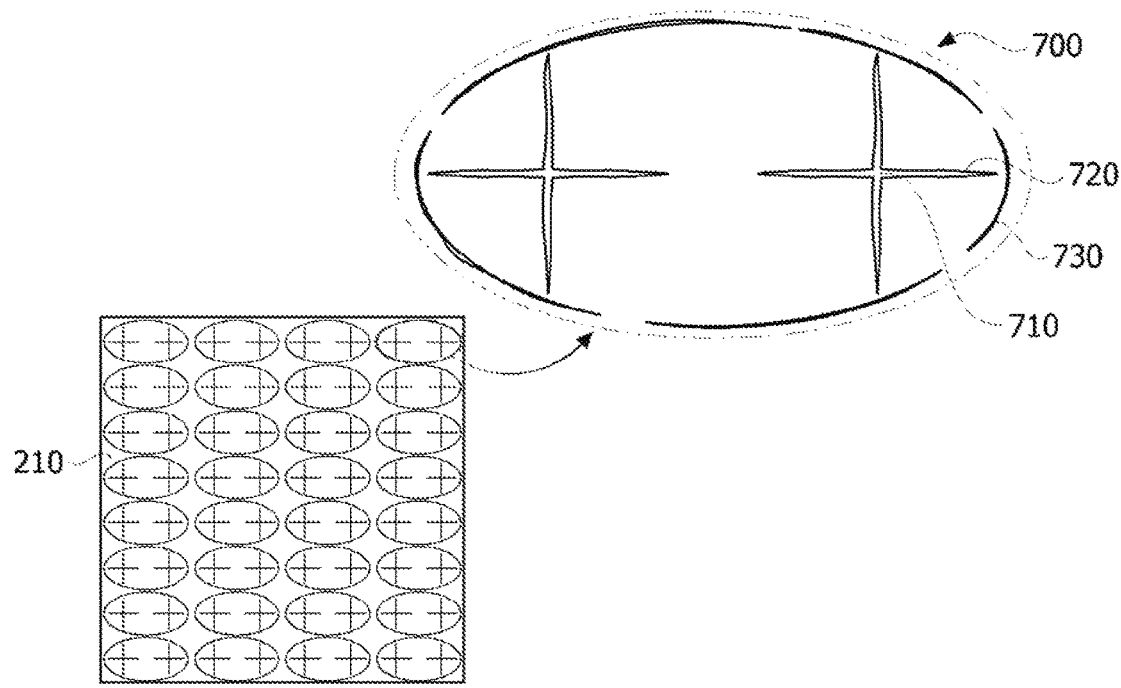
FIG. 12 shows a top view of a soft magnetic substrate according to yet another embodiment of the present invention.

FIG. 12 shows a top view of a soft magnetic substrate according to yet another embodiment of the present invention.

Referring to FIG. 12, a pattern 700 including at least 3 lines 720 which are radiated from predetermined points 710, and an edge 730 which surrounds at least 2 of the lines is formed on the soft magnetic layer 210. Here, the pattern may be formed as cracks. In this case, a plurality of patterns 700 may be formed repeatedly, and one pattern 700 may be arranged to be surrounded by a plurality of patterns, for example, by 3 to 8 patterns 700.

As described above, when a repetitive pattern is formed on the soft magnetic layer 210, it is possible to reduce an eddy current loss and to obtain uniform and predictable transfer efficiency.

At this time, an average diameter of each pattern 700 may be 50 μm to 600 μm, preferably 75 μm to 500 μm, and more preferably 100 μm to 300 μm. When the diameter of pattern 700 is less than 50 μm, there may be a problem in terms of metal particles being created on a surface of the metal ribbon when forming cracks. In the case metal particles are present on the surface of the soft magnetic layer 210, there is a risk of circuit shorting because the metal particles may penetrate into the circuit. In contrast, when the diameter of the pattern 700 exceeds 600 μm, the effect of crack formation, that is, the effect of increasing the actual permeability may be decreased because the distance between the patterns 700 is great.

According to an embodiment of the present invention, it is possible to pressurize the metal ribbon by using a roller on which pattern shapes are embossed in order to form a uniform pattern of cracks on the metal ribbon. In this case, the roller may be made of urethane material. The roller made of urethane material may form a pattern of cracks more uniformly as compared with a roller made of metal material, and minimize the phenomenon in which metal particles remain on the surface of the metal ribbon. At this time, a pressing process may be performed under a period of 10 minutes or less at 25 to 200 Pa or 10 to 3000 Pa.

As described above, by using the metal ribbon on which a repetitive pattern of cracks is formed as a soft magnetic layer of the wireless power receiving apparatus, it is possible to increase magnetic permeability and saturation magnetism, and to reduce the eddy current loss. In addition, by forming the uniform pattern of cracks on the metal ribbon, it is possible to increase the transfer efficiency and to obtain a uniform and predictable performance.

Figure 13:
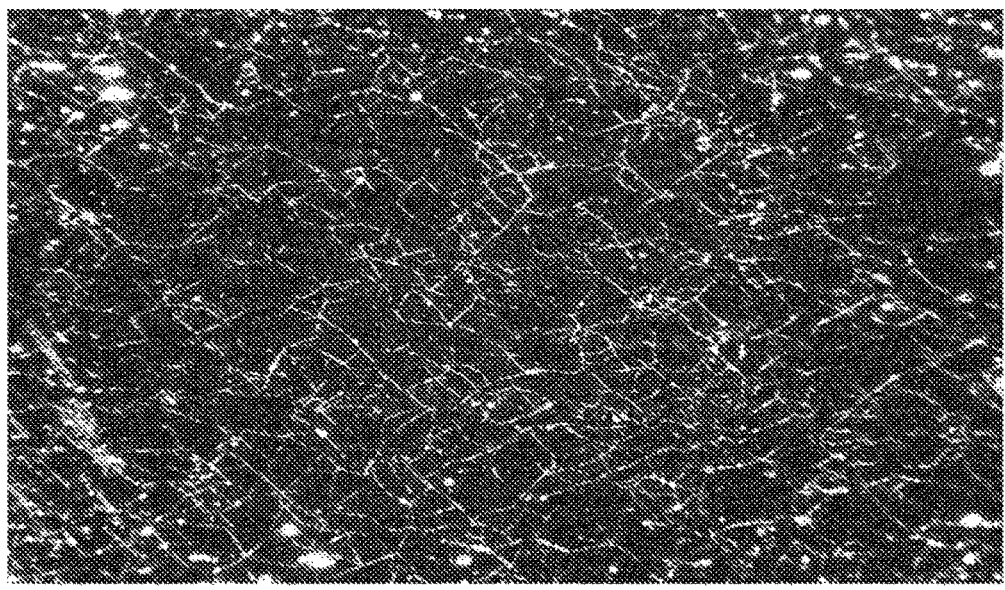
FIG. 13 shows a metal ribbon which is used in comparative embodiment 1.
Figure 14:
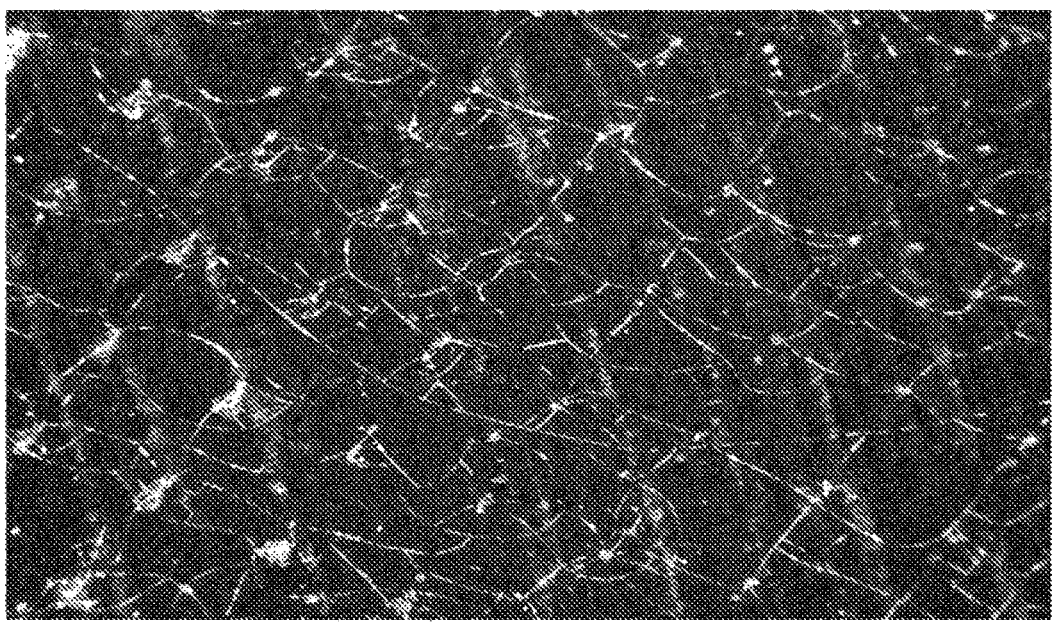
FIG. 14 shows a metal ribbon which is used in embodiment 1.
Figure 15:
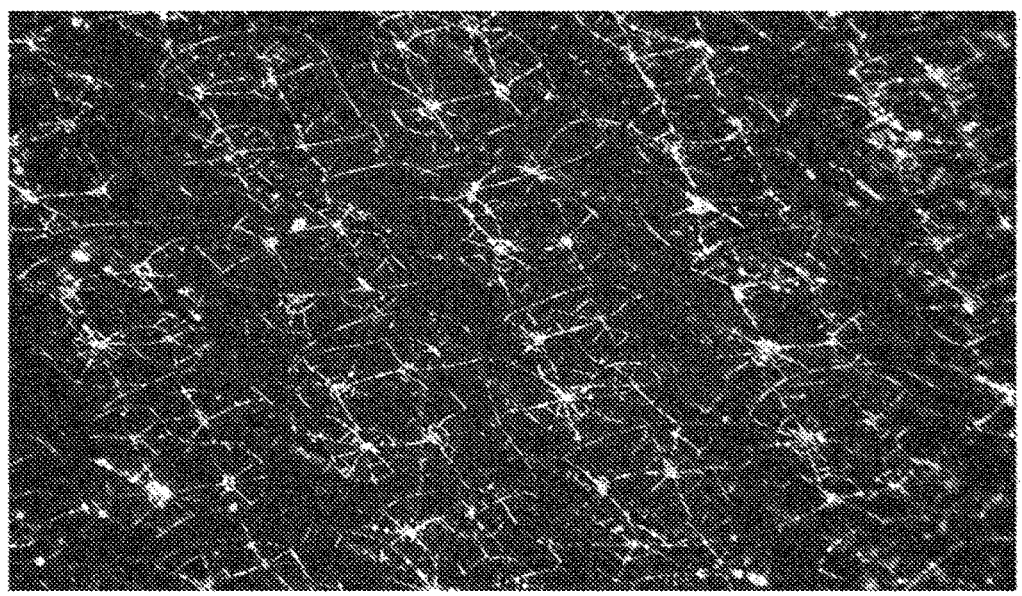
FIG. 15 shows a metal ribbon which is used in embodiment 2.
Figure 16:
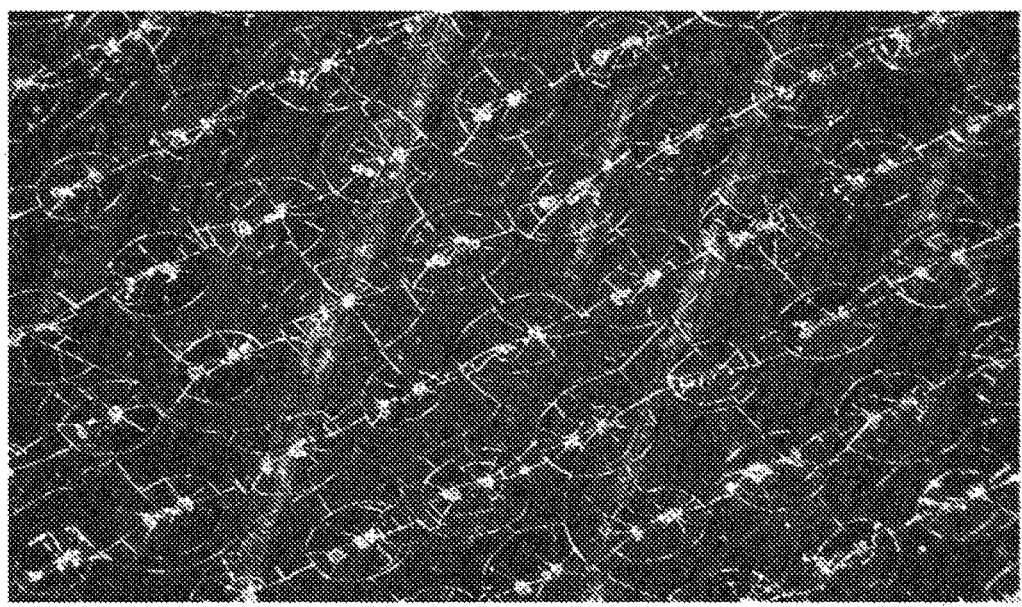
FIG. 16 shows a metal ribbon which is used in embodiment 3.

Table 1 is a table comparing the performance of the transfer efficiency of the wireless power transfer system in the case of using a metal ribbon on which cracks are randomly formed as a soft magnetic layer and a metal ribbon on which a repetitive pattern of cracks is formed as a soft magnetic layer. Here, the metal ribbon is a nanocrystalline metal ribbon containing Fe. FIG. 13 shows a metal ribbon having random cracks which is used in comparative embodiment 1, FIG. 14 shows a metal ribbon having repetitive cross-shaped cracks which is used in embodiment 1, FIG. 15 shows a metal ribbon having repetitive cross-shaped cracks surrounded within an edge which is used in embodiment 2, and FIG. 16 shows a metal ribbon having repetitive star-shaped cracks (having 8 lines which are radiated from predetermined points) surrounded within an edge which is used in embodiment 3.

TABLE 1

| No. | Pattern shape | transfer efficiency (@3 W) | transfer efficiency (@5 w) | Metal particles |
|---|---|---|---|---|
| Comparative embodiment 1 | Random shape | 68% | 69.9% | ○ |
| Embodiment 1 | Cross shape | 68% | 70.1% | X |

TABLE 1-continued

| No. | Pattern shape | transfer efficiency (@3 W) | transfer efficiency (@5 w) | Metal particles |
|---|---|---|---|---|
| Embodiment 2 | Cross shape surrounded by edge | 68.2% | 69.9% | X |
| Embodiment 3 | Star shape surrounded by edge | 69.9% | 71.7% | X |

Referring to Table 1 and FIG. 13 to FIG. 16, it can be seen that the metal ribbon on which a regularly repeated pattern of cracks is formed has higher transfer efficiency than the metal ribbon on which cracks are formed in a random shape. In particular, as shown in the embodiment 3, it can be seen that a pattern has the highest transfer efficiency when it includes at least 6 lines radiated from predetermined points and an edge surrounding the lines, that is, the pattern has a star-shape which is surrounded by an edge.

As shown in Table 1, the effects of a repetitive pattern of crack formation may be more advantageous at high power. This is because the intensity of the magnetic field increases with the increase of the amount of current, and the metal ribbon of the receiving unit is affected more by the magnetic field as the intensity of the magnetic field increases.

Although exemplary embodiments of the present invention have been referenced and described above, it will be understood that it is possible for those of ordinary skill in the art to implement modifications and variations on the present invention without departing from the concept and scope of the present invention listed in the following appended claims.

DESCRIPTION OF REFERENCE NUMERALS

1100 AC/DC conversion unit at the transmission side
1110 rectifier
1120 DC/DC conversion unit at the transmission side
1200 DC/AC conversion unit at the transmission side
1300 impedance matching unit at the transmission side
1400 transmitting coil unit
1500 communication and control unit at the transmission side
1510 control unit at the transmission side
1520 communication unit at the transmission side
2000 receiving unit
2100 coil unit at the reception side
2200 impedance matching unit at the reception unit
2300 AC/DC conversion unit at the reception side
2400 DC/DC conversion unit at the reception side
2500 load unit
2600 communication and control unit at the reception side
2610 control unit at the reception side
2620 communication unit at the reception side
100 wireless power transmitting apparatus
200 wireless power receiving apparatus
700 pattern

The invention claimed is:

1. A magnetic sheet, comprising:
a substrate; and
a soft magnetic layer arranged on the substrate,
wherein the soft magnetic layer includes an Fe-based metal ribbon in which crack patterns are formed,
wherein the crack patterns include a first pattern and a plurality of second patterns disposed to be adjacent to the first pattern,
wherein each of the first pattern and the plurality of second patterns includes six or more radiated lines that radiate from a predetermined center point, and an edge portion that surrounds the radiated lines,
wherein the number of the plurality of second patterns is 3 to 8,
wherein the center points of the first pattern and the plurality of second patterns are spaced apart from each other by a predetermined rule,
wherein a portion of a region between the edge portion of the first pattern and the edge portions of the plurality of second patterns includes a non-pattern area, and
wherein a part of the edge portion of the first pattern includes a discontinuous section.

2. The magnetic sheet of claim 1, wherein the first pattern includes:
a first region formed by a first radiated line and a second radiated line, which are adjacent to each other. among the plurality of radiated lines;
a second region formed by the second radiated line and a third radiated line, which are adjacent to each other;
a third region formed by the third radiated line and a fourth radiated line, which are adjacent to each other;
a fourth region formed by the fourth radiated line and a fifth radiated line, which are adjacent to each other; and
a fifth region formed by the fifth radiated line and a sixth radiated line, which are adjacent to each other,
wherein the edge portion of the first pattern includes a plurality of edge lines,
wherein the plurality of edge lines include:
a first edge line that surrounds a part of the first region; and
a second edge line that surrounds a part of the second region and extends from the first edge line, and
wherein the discontinuous section is formed in the third region.

3. The magnetic sheet of claim 2,
wherein at least one of the plurality of radiated lines of the first pattern is not connected to the edge portion of the first pattern.

4. The magnetic sheet of claim 2, wherein
the first and second radiated lines of the first pattern, which are adjacent to each other, form an acute angle,
the second and third radiated lines of the first pattern, which are adjacent to each other, form an acute angle,
the third and fourth radiated lines of the first pattern, which are adjacent to each other, form an acute angle,
the fourth and fifth radiated lines of the first pattern, which are adjacent to each other, form an acute angle, and
the fifth and sixth radiated lines of the first pattern, which are adjacent to each other, form an acute angle.

5. The magnetic sheet of claim 1,
wherein the edge portion of the first pattern has a circular shape.

6. The magnetic sheet of claim 4,
further comprising a plurality of radiated lines, which radiate from the center point of the first pattern, between the fifth region and the first region.

7. The magnetic sheet of claim 1,
wherein a distance between two predetermined points of the edge portion, which face each other and come into contact with a virtual straight line passing through the center point of the first pattern, is in a range of 50 μm to 600 μm.

8. The magnetic sheet of claim 1,
wherein a thickness of the soft magnetic layer is in a range of 0.01 mm to 0.04 mm.

9. The magnetic sheet of claim 1,
wherein a part of the edge portions of the plurality of the second patterns includes at least one discontinuous section.

10. A magnetic sheet, comprising:
a substrate; and
a soft magnetic layer arranged on the substrate,
wherein the soft magnetic layer includes an Fe-based metal ribbon in which crack patterns are formed,
wherein the crack patterns include a first pattern and a plurality of second patterns disposed to be adjacent to the first pattern,
wherein each of the first pattern and the plurality of second patterns includes six or more radiated lines that radiate from a predetermined center point; and an edge portion that surrounds the radiated lines,
wherein the number of the plurality of second patterns is 3 to 8,
wherein the center points of the first pattern and the plurality of second patterns are spaced apart from each other by a predetermined rule,
wherein a portion of a region between the edge portion of the first pattern and the edge portions of the plurality of second patterns includes a non-pattern,
wherein the edge portion of the first pattern includes a plurality of edge lines, and
wherein at least one edge line of the plurality of edge lines includes a discontinuous section which is not connected to another edge line adjacent thereto.

11. The magnetic sheet of claim 10, wherein the first pattern includes:
a first region formed by a first radiated line and a second radiated line, which are adjacent to each other, among the plurality of radiated lines;
a second region formed by the second radiated line and a third radiated line, which are adjacent to each other;
a third region formed by the third radiated line and a fourth radiated line, which are adjacent to each other;
a fourth region formed by the fourth radiated line and a fifth radiated line, which are adjacent to each other; and
a fifth region formed by the fifth radiated line and a sixth radiated line, which are adjacent to each other, wherein the plurality of edge lines of the first pattern include:
a first edge line which surrounds at least a part of the first region and is closest to the center point of the first pattern; and
a second edge line which surrounds at least a part of the second region, extends from the first edge line, and is closest to the center point of the first pattern, and
wherein the discontinuous section is formed in the third region.

12. The magnetic sheet of claim 11, further comprising:
a third edge line that surrounds at least a part of the third region and is closest to the center point of the first pattern; and
a fourth edge line that surrounds at least a part of the fourth region and is closest to the center point of the first pattern.

13. The magnetic sheet of claim 12,
wherein the third edge line extends from the second edge line, and the third edge line is spaced apart from the fourth edge line.

14. The magnetic sheet of claim 13,
wherein an end point of the first edge line is directly connected to a start point of the second edge line, an end point of the second edge line is directly connected to a start point of the third edge line, and an end point of the third edge line is spaced apart from a start point of the fourth edge line.

15. The magnetic sheet of claim 10
wherein at least one of the plurality of radiated lines of the first pattern is not connected to the edge portion of the first pattern.

16. The magnetic sheet of claim 10, wherein the edge portion of the first pattern has a circular shape.

17. The magnetic sheet of claim 11, further comprising a plurality of radiated lines, which are radiated from the center point of the first pattern, between the fifth region and the first region.

18. The magnetic sheet of claim 11,
wherein a distance between two predetermined points of the edge portion, which face each other and come into contact with a virtual straight line passing through the center point of the first pattern, is in a range of 50 μm to 600 μm.

19. The magnetic sheet of claim 11,
wherein a part of the edge portions of the plurality of second patterns includes at least one discontinuous section.

20. A wireless power receiving apparatus comprising:
a substrate;
a soft magnetic layer arranged on the substrate; and
a coil arranged on the soft magnetic layer,
wherein the soft magnetic layer includes an Fe-based metal ribbon in which crack patterns are formed,
wherein the crack patterns include a first pattern and a plurality of second patterns disposed to be adjacent to the first pattern,
wherein each of the first pattern and the plurality of second patterns includes six or more radiated lines that radiate from a predetermined center point and an edge portion that surrounds the radiated lines,
wherein the number of the plurality of second patterns is 3 to 8,
wherein the center points of the first pattern and the plurality of second patterns are spaced apart from each other by a predetermined rule,
wherein a portion of a region between the edge portion of the first pattern and the edge portions of the plurality of second patterns includes a non-pattern area, and
wherein a part of the edge portion of the first pattern includes a discontinuous section.

* * * * *